United States Patent Office 3,545,150
Patented Dec. 8, 1970

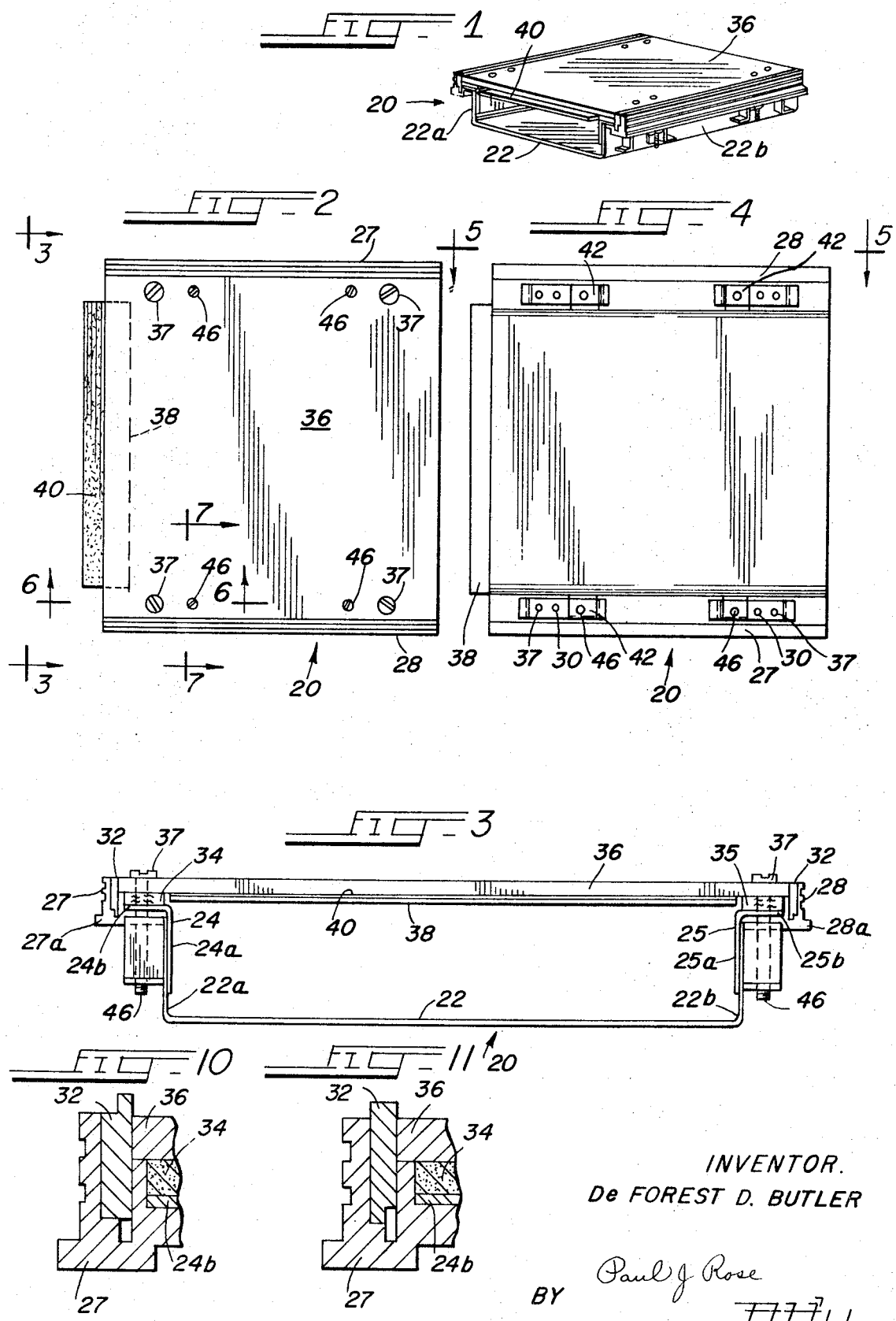

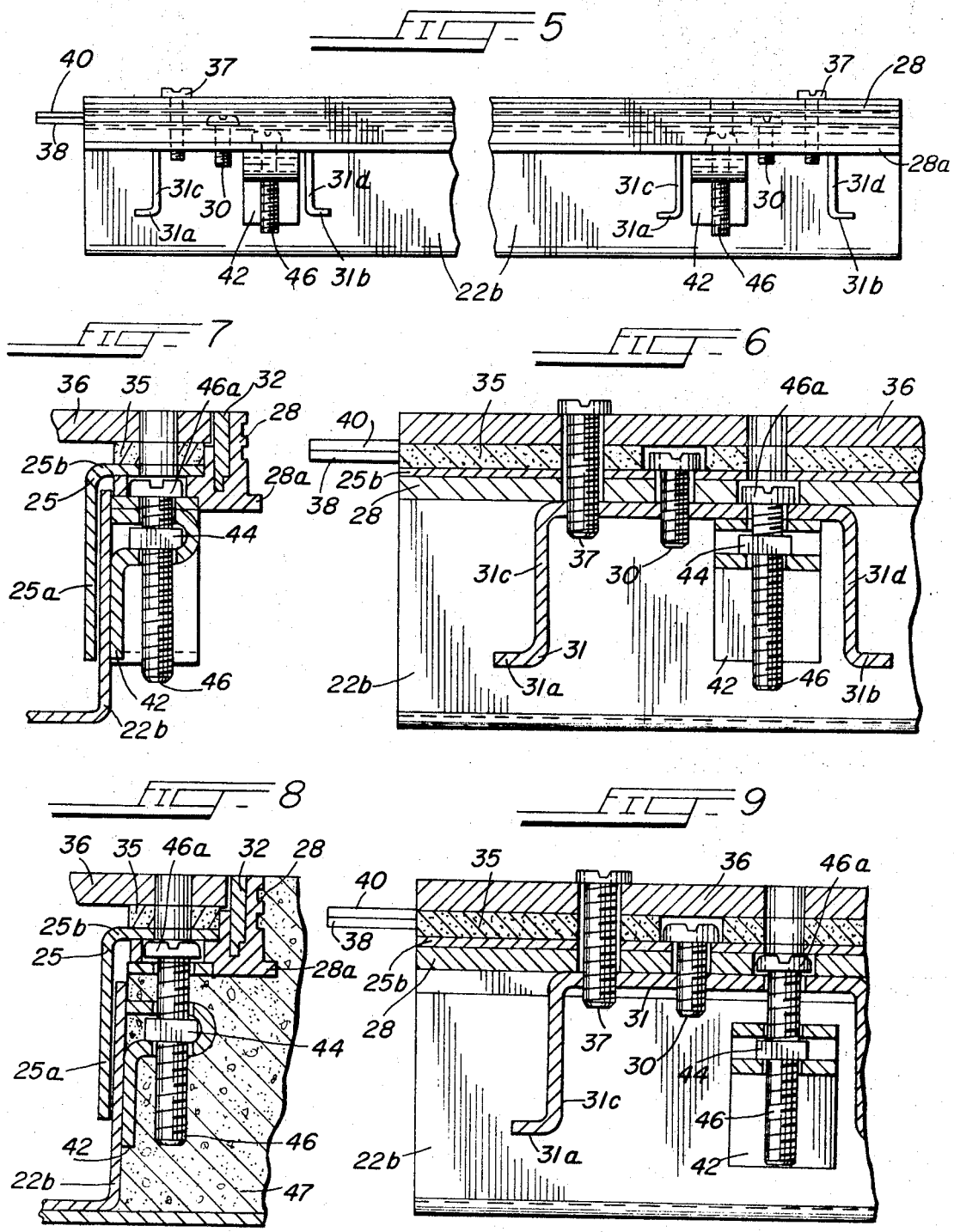

3,545,150
UNDERFLOOR WIRING TRENCH DUCT
De Forest D. Butler, Lexington, Ky., assignor to Square
 D Company, Park Ridge, Ill., a corporation of Michigan
Filed Oct. 16, 1968, Ser. No. 768,007
Int. Cl. E04f 19/00
U.S. Cl. 52—220                        13 Claims

ABSTRACT OF THE DISCLOSURE

A channel-shaped body has two outwardly flanged side extensions nested therein respectively adjacent opposite side wall portions. Two cover plate mounting rails are secured respectively to the flanges of the side extensions by a plurality of screws threaded respectively into a plurality of generally U-shaped brackets. A plurality of nut-holding brackets are secured to the outer surfaces of the side wall portions of the channel-shaped body, and a plurality of adjusting screws are threaded respectively into the nuts in the nut-holding brackets, the adjusting screws having head portions disposed in the cover plate mounting rails and trapped between the flanges of the side extensions and the respective U-shaped brackets. A cover plate is removably secured in position by a plurality of screws threaded respectively into the U-shaped brackets. Each cover plate mounting rail has a lateral projection serving to anchor the assembly in concrete, and each generally U-shaped bracket has the free end portions of its legs bent to extend parallel to the bight portion so as to anchor the assembly in concrete.

---

This invention relates to an improved trench duct for underfloor electrical service wires, the duct having side extensions and cover plate mounting rails vertically adjustable before the pouring of a concrete floor on opposite sides of the duct, but non-adjustable after the concrete is set because of positive locking therein.

An object of the invention is to provide an improved trench duct for underfloor electrical service wires.

Another object is to provide a trench duct adjustable in height before the setting of concrete poured on opposite sides thereof, but positively locked in the concrete after the setting thereof to provide a rigid construction capable of subjection to heavy loads without deterioration of floor appearance thereabout.

A further object is to provide a trench duct having improved bracket-and-screw assemblies spaced longitudinally therealong on oposite sides thereof, each assembly including a first screw threaded into a generally U-shaped clamping member to secure a vertically adjustable flanged side extension and a cover plate mounting rail together, a second screw threaded into the U-shaped clamping member to secure a cover plate in place, and a third screw threaded into a nut in a nut-holding bracket secured to a stationary side of the duct, the third screw having a head portion trapped between the U-shaped bracket and the flange of the side extension and being adjustable through aligned holes in the cover plate and flange of the side extension to vertically adjust the side extension and cover plate mounting rail.

A still further object is to provide a trench duct with an improved tile trim.

Other objects will appear when the following specification is considered along with the accompanying drawings, in which:

FIG. 1 is a perspective view of a shortened section of trench duct constructed in accordance with the invention;

FIG. 2 is a top view of the trench duct of FIG. 1;

FIG. 3 is an enlarged end view of the trench duct of FIG. 1 taken in the direction of arrows 3—3 of FIG. 2;

FIG. 4 is a bottom view of the trench duct of FIG. 1;

FIG. 5 is an enlarged broken-away side view of the trench duct of FIG. 1 taken in the direction of arrows 5—5 of FIG. 4;

FIG. 6 is an enlarged fragmentary sectional view taken along the line 6—6 of FIG. 2;

FIG. 7 is an enlarged fragmentary sectional view taken along the line 7—7 of FIG. 2;

FIG. 8 is a view similar to FIG. 7 but showing certain portions in a raised position and illustrating a portion of a concrete floor;

FIG. 9 is a view similar to FIG. 6, but showing certain portions in a raised position;

FIG. 10 is an enlarged fragmentary view of a left-hand portion of FIG. 3, but showing a tile trim strip in position to provide a relatively thin tile trim; and FIG. 11 is a view similar to FIG. 10, but showing the tile trim strip in position to provide a relatively thick tile trim.

With reference to the drawings, FIGS. 1–4 show a section of trench duct 20 constructed in accordance with the invention. The trench duct 20 is a shortened section one foot long, which is long enough to illustrate the principles of the invention, but it should be understood that a standard section is normally six feet long.

The trench duct 20 includes a channel-shaped body 22 including a pair of oposite side walls 22a and 22b. Nested within the body 22 are two outwardly flanged side extensions 24 and 25 including barrier portions 24a and 25a respectively adjacent the inner surfaces of the side walls 22a and 22b and outwardly extending flange portions 24b and 25b. Secured respectively to the under surfaces of the flange portions 24b and 25b are two cover plate mounting rails 27 and 28 of generally L-shaped cross section. A plurality of clamping screws 30 threaded respectively into a plurality of generally U-shaped clamping brackets 31 spaced longitudinally of the body 22, clamp the mounting rails 27 and 28 respectively to the flange portions 24b and 25b.

Each of the mounting rails 27 and 28 is provided with a steped groove in which a tile trim strip 32 stepped on one edge is mountable in any of three positions, namely, flush, as shown in FIGS. 3, 7, and 8, when no tile is to be installed over a concrete floor; stepped edge up, as shown in FIG. 10, when a tile trim of one-sixteenth of an inch is to be provided; and stepped edge down but reversed from the groove, as shown in FIG. 11, when a tile trim of one-eighth of an inch is to be provided.

Two gasket strips 34 and 35 are glued respectively to the flange portions 24b and 25b. A cover plate 36 is removably secured in position on the gasket strips 34 and 35 by a plurality of fastening screws 37 threaded respectively into the clamping brackets 31. A standard six-foot length of trench duct is provided with three two-foot cover plates or two three-foot cover plates, and a seal must be provided between adjacent cover plates. For this purpose, each cover plate such as the plate 36 has a gasket support strip 38 welded to the under surface of a transverse edge portion thereof. A gasket strip 40 is glued to the support strip 38 and adapted to be engaged by another cover plate.

Each of the side wall portions 22a and 22b has a plurality of nut-holding brackets 42 welded to the outer surface thereof. Each bracket 42 includes a reversely bent portion in which a nut 44 is retained with the aid of an adjusting screw 46 threaded therethrough. A slotted head portion 46a of each screw 46 is trapped in a respective one of the mounting rails 27 and 28 between a respective one of the flange portions 24b and 25b and a respective one of the clamping brackets 31. The head portions 46a are accessible by a screwdriver through suitable apertures in the cover plate 36, gasket strips 34 and 35, and flange portions 24b and 25b. FIGS. 6 and 7 show one of the clamping brackets 31, the mounting rail 28, the flange portion 25b, the gasket strip 35, and the cover plate 36 in a lowermost position, while FIGS. 8 and 9 show a raised position thereof effected by the turning of the adjusting screw 46 outwardly of its nut 44 and the bearing of the head portion 46a against the under surface of the flange portion 25b. The raised positions of the mounting rails 27 and 28 and the flange portions 24b and 25b can be effected both when the cover plate 36 is in place and when it is removed.

The mounting rails 27 and 28 are provided respectively with projecting portions 27a and 28a for anchoring the mounting rails in place in a poured concrete floor 47 fragmentarily shown in FIG. 8. Further anchoring is provided by the brackets 31 each of which has outwardly bent free end portions 31a and 31b respectively on a pair of spaced leg portions 31c and 31d.

Thus, an improved trench duct has been provided which is adjustable before, but not after, the setting of a concrete floor therearound.

I claim:

1. A trench duct comprising a channel-shaped body having a bottom portion and a pair of opposite side walls, a pair of side extensions, each of said side extensions including a barrier portion disposed adjacent an inner surface of and extending generally parallel to a respective one of said side walls and a flange portion extending from the barrier portion over the respective side wall, a pair of cover plate mounting rails disposed respectively adjacent the flange portions of said side extensions, means including a plurality of clamping brackets securing said mounting rails respectively to the flange portions of said side extensions, and a plurality of adjusting screws respectively adjustable to move the secured-together mounting rails and side extensions perpendicularly to said bottom portion, each of said clamping brackets being disposed adjacent and on the outer side of one of said side walls, the bracket and the barrier portion of the respective side extension cooperating with the side wall in guiding movement of the respective secured-together mounting rail and side extension.

2. A trench duct as claimed in claim 1 wherein each of said clamping brackets includes a leg portion substantially coextensive with the barrier portion of the respective side extension in a direction perpendicular to said bottom portion.

3. A trench duct as claimed in claim 1 including a plurality of internally threaded members, each of said side walls having a pair of said internally threaded members mounted on an outer surface thereof, secured against substantial movement relatively thereto in a direction perpendicular to said bottom portion, and spaced longitudinally of said body, and wherein each of said adjusting screws has an externally threaded portion adjustably threaded into a respective one of said internally threaded members and an enlarged head portion secured against substantial movement in both directions axially of the screw relatively to a respective one of the secured-together mounting rails and side extensions.

4. A trench duct as claimed in claim 3 wherein each of said internally threaded members is a nut held in a nut-holding bracket secured to the outer surface of the respective side wall.

5. A trench duct as claimed in claim 1 wherein each of said mounting rails has a stepped groove therein and including a cover plate mounted on said mounting rails and a tile trim strip disposed in each of said grooves, each tile trim strip having a stepped edge portion and being selectively receivable in the respective groove in a first way to present a surface flush with an upper surface of the cover plate, in a second way to present a relatively thin tile trim, and in a third way to present a relatively thick tile trim.

6. A trench duct as claimed in claim 1 including a cover plate and a plurality of fastening screws removably securing said cover plate in position between said mounting rails, each of said fastening screws extending through said cover plate, through a respective one of the secured-together mounting rails and side extensions, and through a respective one of said clamping brackets.

7. A trench duct as claimed in claim 6 wherein each of said fastening screws is in threaded engagement with the respective clamping bracket.

8. A trench duct as claimed in claim 1 wherein each mounting rail is secured to an under surface of the flange portion of the respective side extension.

9. A trench duct as claimed in claim 8 wherein the head portion of each adjusting screw is contained in a respective one of the mounting rails between the flange portion of the respective side extension and a respective one of the clamping brackets.

10. A trench duct as claimed in claim 1 wherein each of said clamping brackets is a generally U-shaped bracket the free end portions of the legs of which are bent over for the anchoring of the bracket in a concrete floor.

11. A trench duct as claimed in claim 1 wherein each of said adjusting screws extends through a respective one of said clamping brackets.

12. A trench duct as claimed in claim 1 wherein besides said clamping brackets, the means securing said mounting rails respectively to the flange portions of said side extensions also includes a plurality of clamping screws each extending through one of said mounting rails and one of said flange portions and through a respective one of said clamping brackets.

13. A trench duct as claimed in claim 12 wherein each of said clamping screws is in threaded engagement with the respective clamping brackets.

References Cited

UNITED STATES PATENTS

| 3,101,097 | 8/1963 | Murray | 52—220 X |
| 3,237,356 | 3/1966 | Fork | 52—220 |
| 3,368,311 | 2/1968 | Fork | 138—159 X |

LAVERNE D. GEIGER, Primary Examiner

R. J. SHER, Assistant Examiner

U.S. Cl. X.R.

138—159